Sept. 22, 1953  J. N. MURPHY  2,652,938
MECHANISM TO TRANSFER AUTOMOBILES
Filed Jan. 16, 1947  6 Sheets-Sheet 1

Inventor
John N. Murphy
By: Schie & Schie
Attys.

Sept. 22, 1953 J. N. MURPHY 2,652,938
MECHANISM TO TRANSFER AUTOMOBILES
Filed Jan. 16, 1947 6 Sheets-Sheet 2

Inventor
John N. Murphy
By: Shier+Shier
Attys

Sept. 22, 1953 J. N. MURPHY 2,652,938
MECHANISM TO TRANSFER AUTOMOBILES
Filed Jan. 16, 1947 6 Sheets-Sheet 3

Inventor
John N. Murphy
By Shea v Shea Attys

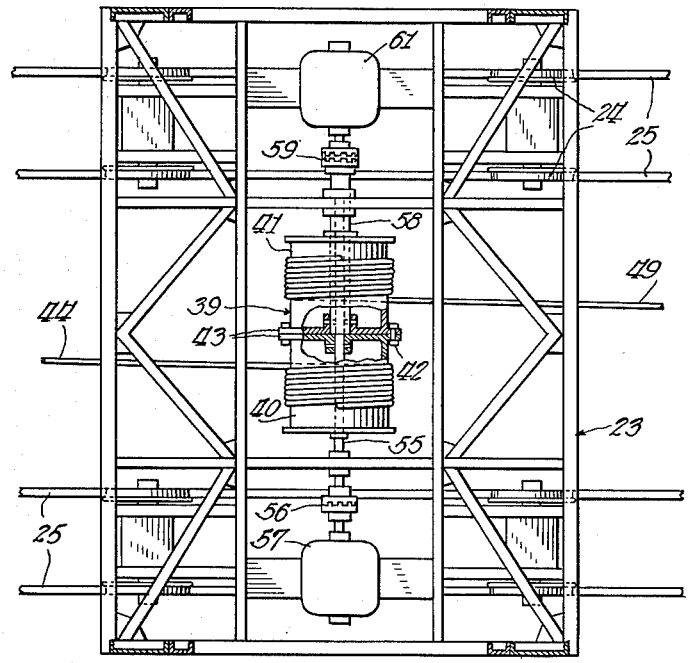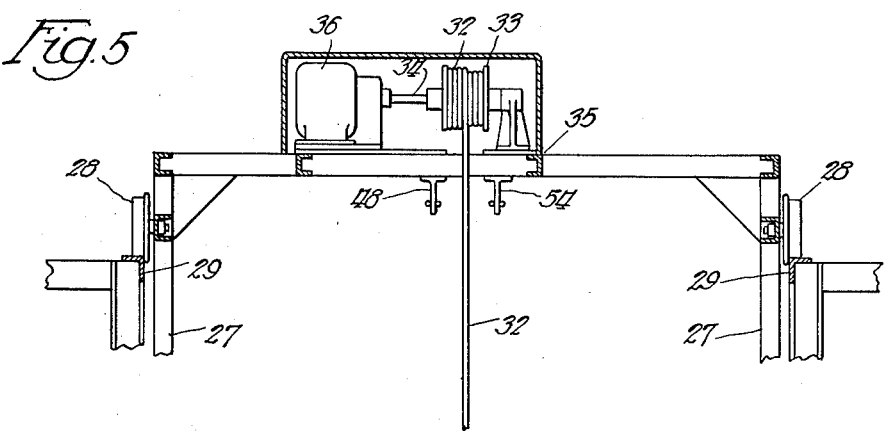

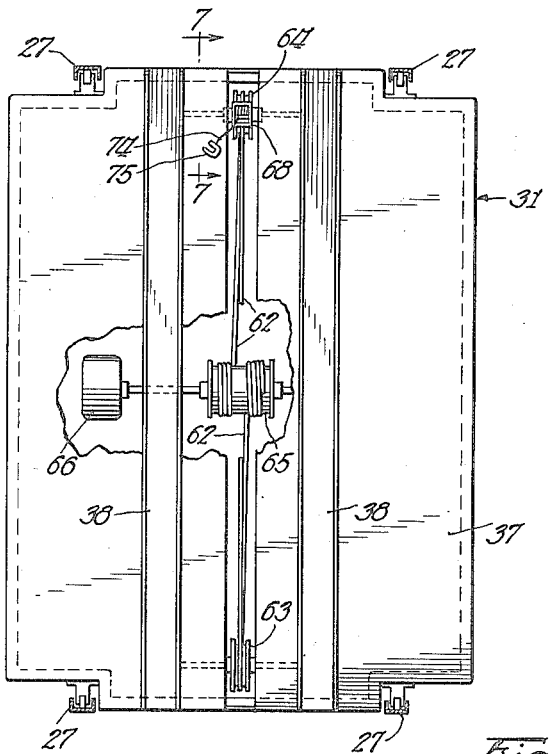
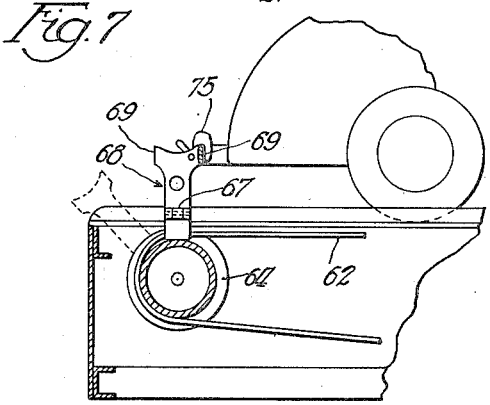
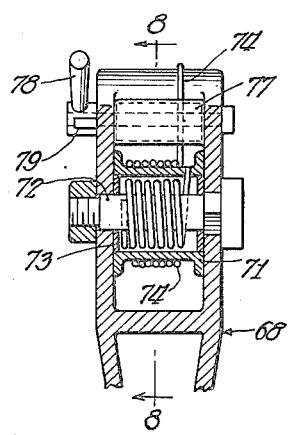
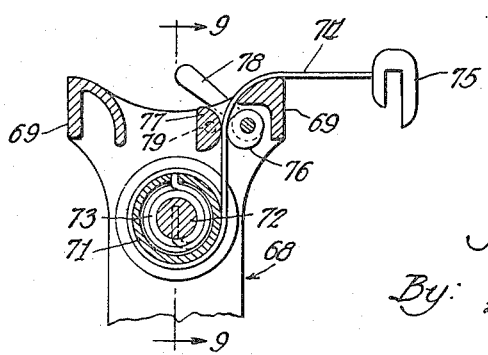

Sept. 22, 1953 J. N. MURPHY 2,652,938
MECHANISM TO TRANSFER AUTOMOBILES
Filed Jan. 16, 1947 6 Sheets-Sheet 6
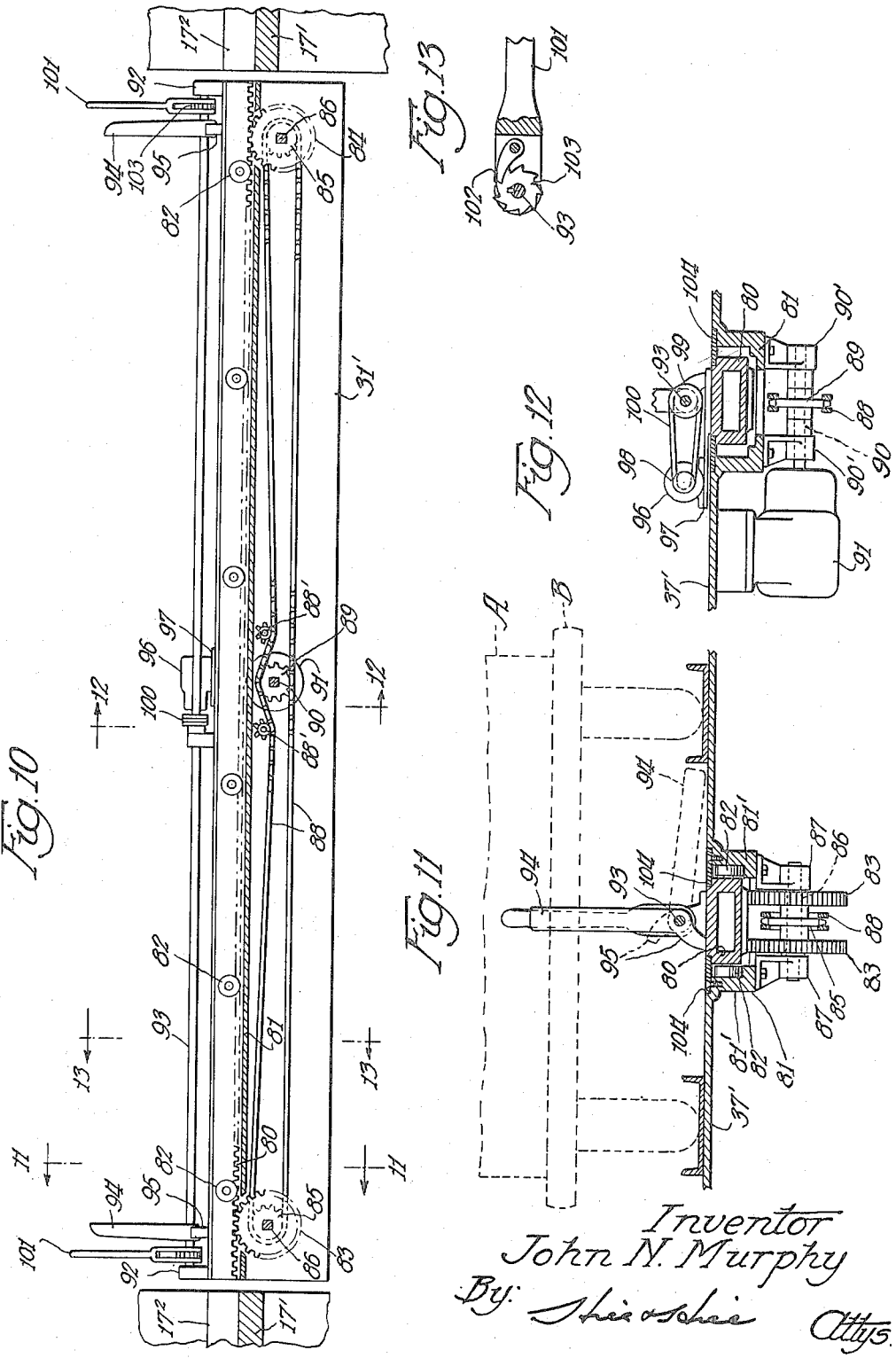
Inventor
John N. Murphy
By: Thie & Schie
Attys.

Patented Sept. 22, 1953

2,652,938

UNITED STATES PATENT OFFICE 2,652,938

MECHANISM TO TRANSFER AUTOMOBILES

John N. Murphy, Springfield, Ill.

Application January 16, 1947, Serial No. 722,421

2 Claims. (Cl. 214—95)

This invention relates to building construction and means for storing automobiles therein on a plurality of levels, so as to utilize a minimum of space for storing and for handling the same.

One object of the present invention is to provide a novel construction and arrangement, whereby a large number of vehicles may be housed with maximum economy in floor space used, and with a maximum of efficiency with respect to convenience and accessibility in handling and moving the vehicles into and out of the storage space provided.

Another object of the invention is to provide novel means for handling the automobile in "dead" or inoperative condition, thereby avoiding the necessity of using the operating mechanism of the vehicle to move the automobile into or out of its storage or parking space.

Another object of the invention is to provide a novel automobile storage device wherein only a minimum operating force is required.

Another object of the invention is to provide a structure for the storage of automobiles having a plurality of superposed storage compartments or stalls, and wherein a horizontally and vertically movable elevator is employed for elevating and positioning the automobiles in alignment with the respective compartments for placing the automobiles therein.

Another object of the invention is to provide a novel construction and arrangement for moving the elevator horizontally, and for retaining the elevator shaft in vertical position.

Another object of the invention is to provide means for moving an automobile onto and from the elevator, and for checking unrestrained movement of the automobile into a stall or compartment.

A further object of the invention is to provide an arrangement whereby automobiles may be received and released at numerous positions on the main or ground floor level.

A still further object of the invention is to improve structures of the character described in sundry details hereinafter referred to, and particularly pointed out in the appended claims.

One embodiment of the present invention is shown for illustrative purposes in the accompanying drawings, in which:

Fig. 4 is an enlarged plan view of the truck construction illustrated in Fig. 1, and taken substantially as indicated by the line 4—4 thereof;

Fig. 5 is an enlarged sectional elevational view of the elevator operating mechanism illustrated in Fig. 1, and taken substantially as indicated by the line 5—5 thereof;

Fig. 6 is an enlarged plan view of the elevator cage platform, taken substantially as indicated by the line 6—6 of Fig. 1;

Fig. 7 is a further enlarged fragmentary sectional elevational view of a portion of the structure illustrated in Fig. 6, and taken substantially as indicated by the line 7—7 thereof;

Fig. 8 is a further enlarged fragmentary sectional elevational view of a pusher shown in Figs. 6, 7 and 9, and taken substantially as indicated by the line 8—8 of Fig. 9;

Fig. 9 is a fragmentary sectional elevational view, taken substantially as indicated by the line 9—9 of Fig. 8;

Fig. 10 is a longitudinal section through a modified form of pusher.

Fig. 11 is a detail vertical cross-section taken on the line 11—11 of Fig. 10;

Fig. 12 is a detail vertical cross-section taken on the line 12—12 of Fig. 10; and Fig. 13 is a detail section through a certain pawl and ratchet lever seen in Fig. 10.

Figure 1:
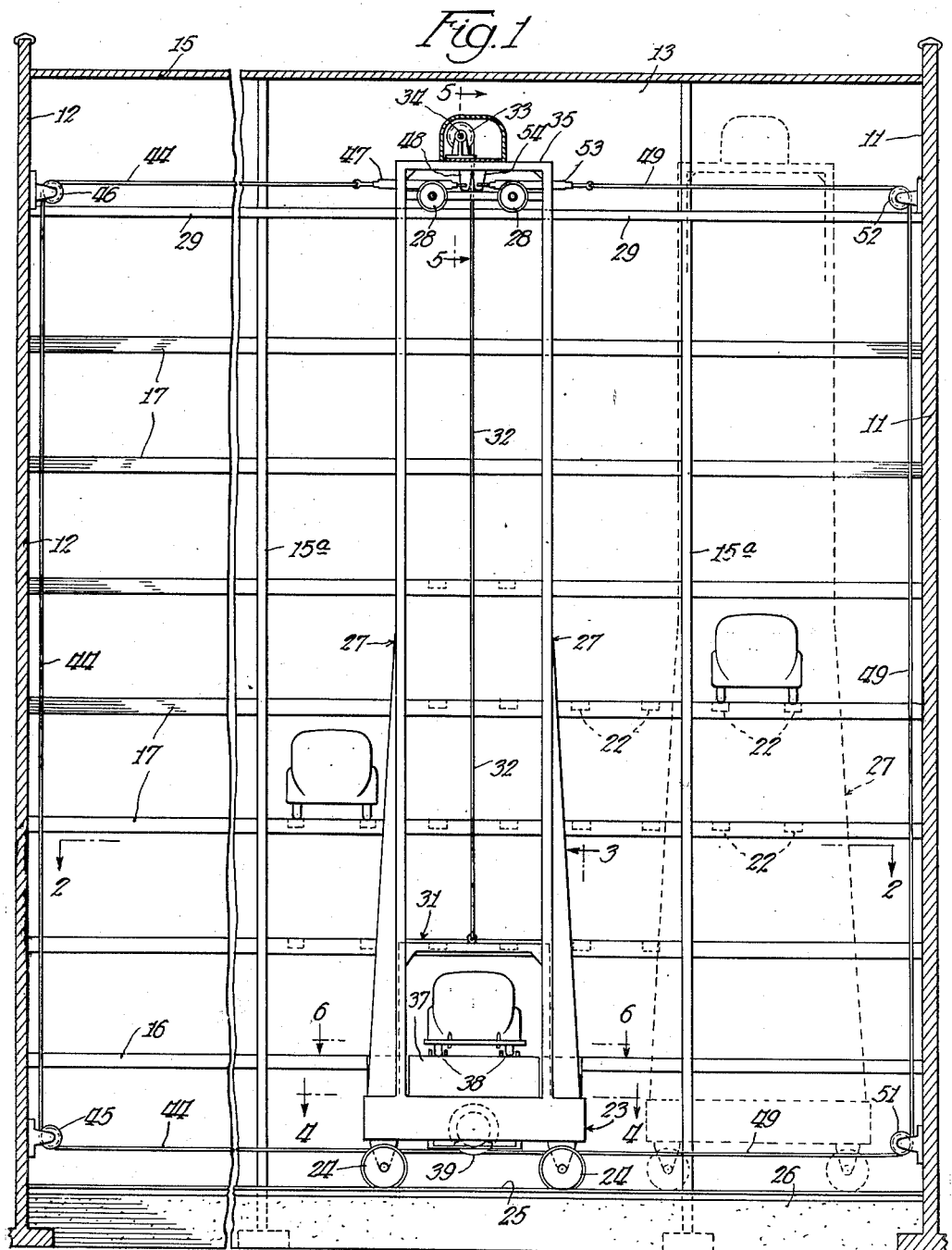
Fig. 1 is a sectional elevational view of a storage building structure embodying features of the present invention, and taken substantially as indicated by the line 1—1 of Fig. 2.

In the illustrative embodiment shown in the drawings, the present invention comprises a building structure having front and rear walls 11 and 12 respectively, side walls 13 and 14, a roof portion 15, and floor and roof supporting columns 15a, the building structure being provided also with a ground floor 16 and superposed floors 17, the floors 17 being shown in the present instance as extending along and adjacent the side walls 13 and 14 from the front wall 11 to the rear wall 12, and having their inner edge portions, indicated at 18, spaced a substantial distance apart to provide an aisle 19 between the respective inner edge portions of the floors and extending from the front wall 11 to the rear wall 12 of the building structure.

The respective upper floors 17, and, if desired, a portion of the ground floor 16, are divided into a plurality of automobile receiving compartments indicated by the dot and dash lines 21 (Fig. 2), the floors of each of the respective compartments being provided with a pair of laterally spaced, elongated, substantially parallel channels 22 formed therein and inclined downwardly away from the aisle 19, the channels 22 being adapted to receive the wheels of an automobile placed in the compartments.

Positioned in the aisle 19, and adapted to be moved longitudinally thereof, is a truck, indicated as a whole by the numeral 23, having supporting wheels 24 mounted thereon, and adapted to travel on rails 25, suitably mounted on a pair of foundation structures or abutments 26 extending longitudinally of the aisle 19, and mounted on the truck 23 in a manner to move therewith is an elevator guide frame, indicated as a whole by the numeral 27, and adapted to extend upwardly past the floors 16 and 17 to adjacent the roof 15 of the building, as clearly illustrated in Fig. 1, the upper end portion of the guide frame 27 being provided with truck wheels 28, adapted to travel along rail-like members 29, shown in the present instance as of angle iron construction (Fig. 5), forming a part of the building structure and extending from the front wall 11 to the rear wall 12 thereof in a manner to assist in supporting and guiding the upper end portion of the guide frame 27 in its movement along the aisle 19.

Slidably and vertically movable in the guide frame 27 is an elevator cage, indicated as a whole by the numeral 31, having one end of a hoisting cable 32 connected to the upper portion thereof, the opposite end portion of the cable being wound around a drum 33 (Fig. 5) secured to a shaft 34, rotatably mounted on frame members 35 adjacent the upper portion of the guide frame 27 and operatively related to a motor 36 mounted thereon for rotating the drum 33 to control the raising and lowering of the elevator cage 31.

Figure 2:
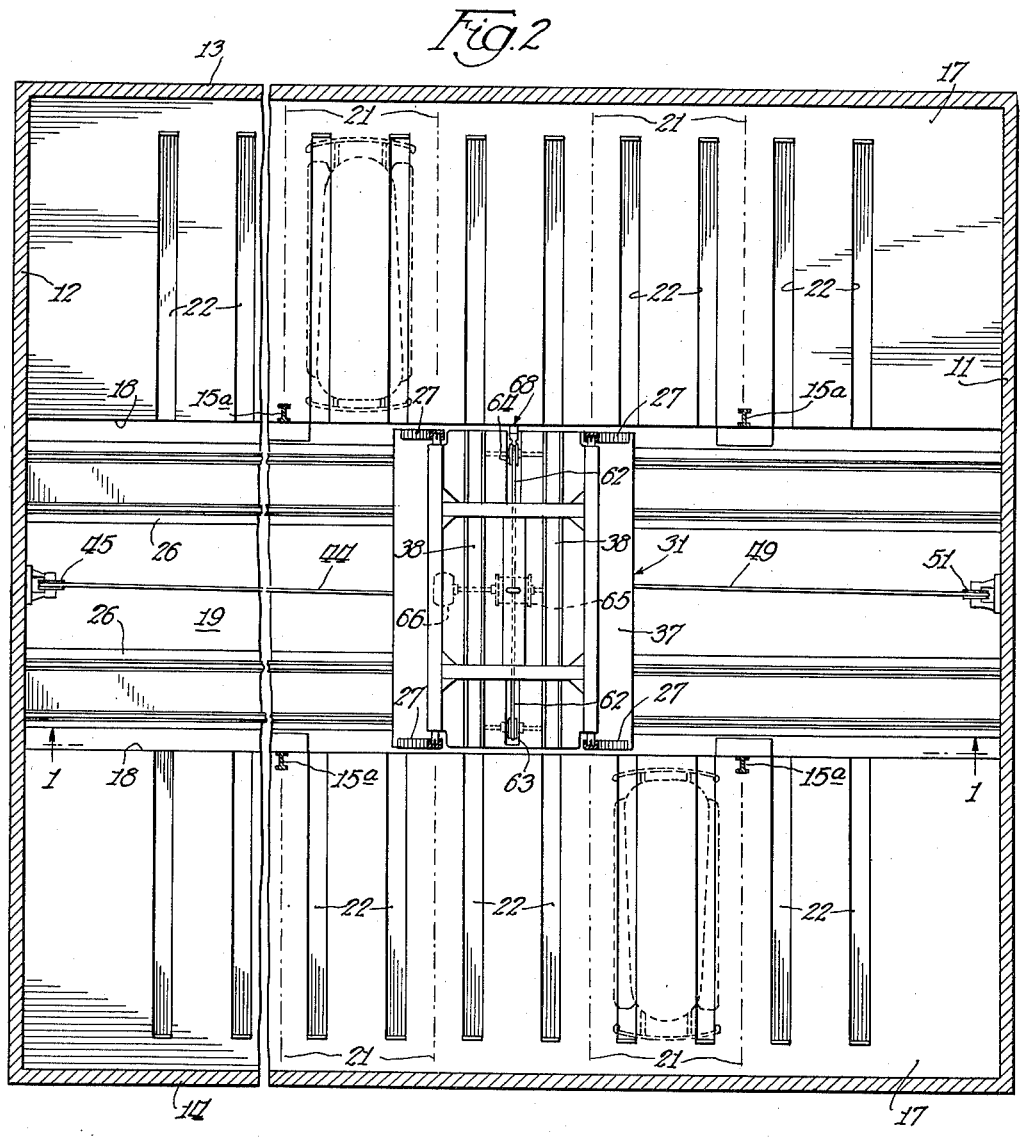
Fig. 2 is a plan sectional view of the structure illustrated in Fig. 1, and taken substantially as indicated by the line 2—2 thereof.

As illustrated in Figs. 1, 2 and 6, a platform 37 of the cage 31 is provided with a pair of laterally spaced, elongated channels 38, extending from end to end thereof and adapted to receive the wheels of an automobile to properly position the automobile on the platform 37 of the cage 31.

Figure 3:
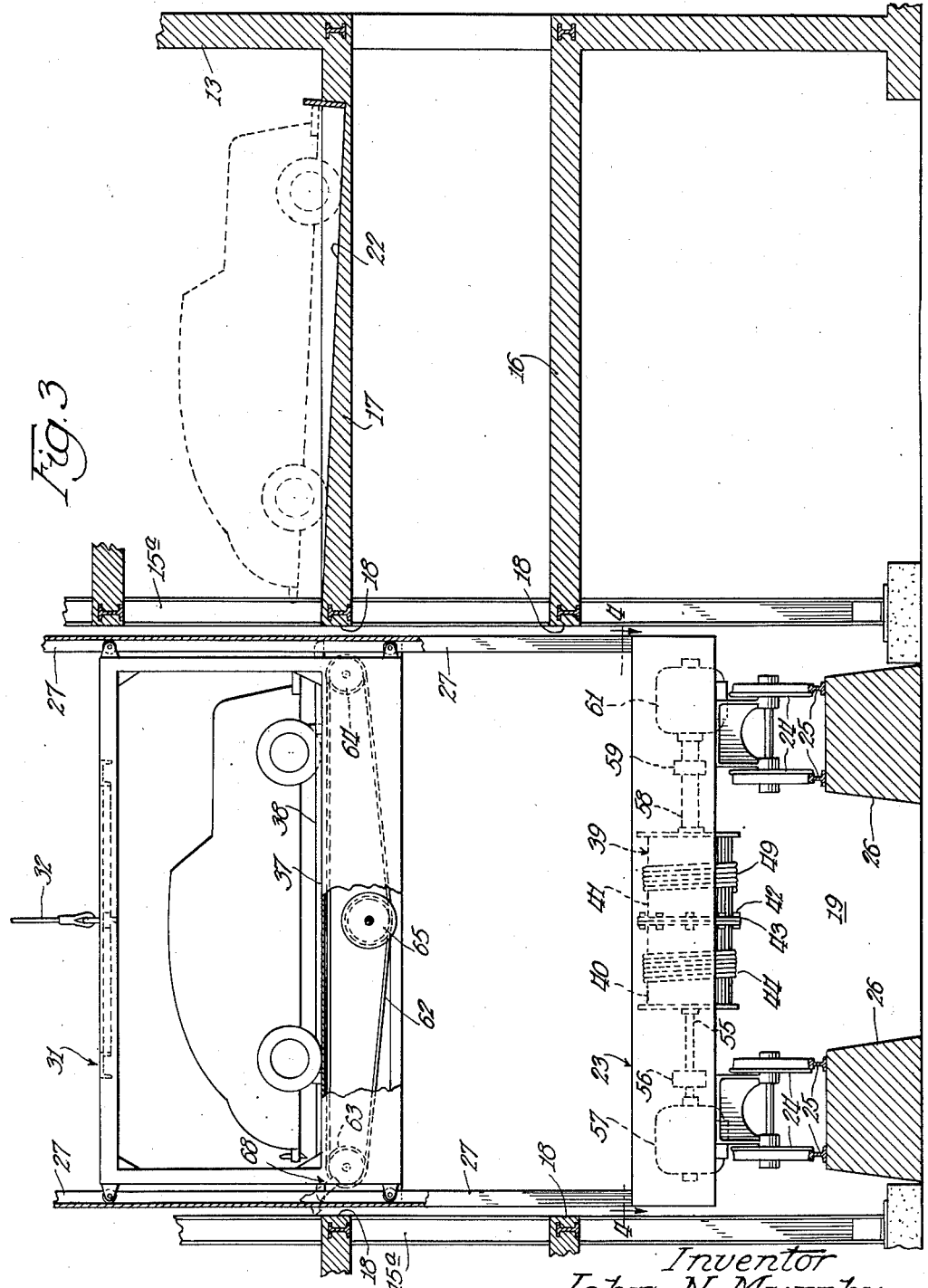
Fig. 3 is an enlarged fragmentary sectional elevational view of a portion of the structure illustrated in Figs. 1 and 2, and showing the elevator cage in elevated position, the view being taken substantially as indicated by the line 3—3 of Fig. 1.

For moving the truck 23 and guide frame 27 mounted thereon longitudinally of the aisle 19 in a manner to position the channels 38 of the elevator cage platform in proper alignment with the channels 22 of the respective compartments on the respective floors 17 of the building structure, and in a manner to accurately position an automobile therein, the truck 23 is provided with a drum, indicated as a whole by the numeral 39 (Figs. 3 and 4), and shown in the present instance as comprising a pair of axially aligned, end abutting drum sections 40 and 41, adapted to be secured together adjacent their abutting portions by means of bolts 42 extending through adjacent flanges 43 on the respective drum sections 40 and 41.

As shown in the present instance, one end portion of a cable 44 is wound around and secured to the drum section 40 and extends rearwardly therefrom over a pair of sheaves 45 and 46 mounted on the rear wall 12 of the building structure, and having its opposite or upper end portion connected through a turnbuckle 47 to a lug 48 mounted on the upper end portion of the guide frame 27, while one end portion of a second cable 49 is wound around the drum section 41 in the opposite direction and extends forwardly therefrom over a pair of sheaves 51 and 52 mounted on the front wall 11 of the building structure, and having its opposite or upper end portion connected through a turnbuckle 53 to a lug 54 mounted on the upper end portion of the guide frame 27, the turnbuckles 47 and 53 being provided to take up or compensate for any stretching or elongation of the cables 44 and 49.

To facilitate the winding of the cables 44 and 49 on the respective drum sections 40 and 41, before the sections have been connected together by means of the bolts 42, the drum section 40 is secured to a shaft 55 rotatably mounted in the truck 23 and operatively related through a clutch 56 to a reversible motor 57, which may be operated to wind the cable 44 a suitable distance onto the drum section 40, while the drum section 41 is secured to a sleeve 58 positioned in axial alignment with and around a portion of the shaft 55 in a manner to rotate on the truck 23, the sleeve 58 being operatively related through a clutch 59 to a reversible motor 61, by which the drum section 41 may be rotated to wind a portion of the second cable 49 thereon.

It will be observed that by such an arrangement, the motor 57 may be operated to rotate the drum section 40 in one direction to wind a portion of the cable 44 thereon, and the motor 61 may be operated to rotate the drum 41 in the opposite direction to wind a portion of the second cable 49 thereon, and that after the cables 44 and 49 have been properly positioned on the respective drum sections 40 and 41, the respective sections may be secured together adjacent their abutting portions by the bolts 42, and that thereafter, the two drum sections may be rotated, as a whole or in unison, by means of either of the motors 57 or 61, while the other of the motors may be retained as a reserve or auxiliary motor in the event that the motor used may, for any reason, become inoperative.

Referring to Figs. 1 and 4, it will be noted that by the arrangement above described, when the drum 39 is rotated in a clockwise direction, for example, the drum section 41 will take up on the cable 49 to move the truck 23 and guide frame 27 mounted thereon, toward the front wall 11 of the building structure, while the cable 44 will pay off from the drum section 40 to permit the movement of the truck 23 and frame member 27 away from the rear wall, and that upon reversal of the drum 39 to rotate in a counterclockwise direction, the drum section 40 will take up on the cable 44, while the cable 49 will pay off from the drum section 41 to permit movement of the truck 23 and frame member 27 in the opposite direction, or toward the rear wall 12 of the building structure, thereby providing a novel construction and arrangement for moving the truck 23 and frame member 27 mounted thereon longitudinally of the aisle 19 in a manner to position the elevator guide frame 27 and elevator cage 31 at various positions between the front and rear walls of the building structure, and to align the channels 38 on the cage platform 37 with the channels 22 of the respective automobile receiving compartments, while the motor 36 (Fig. 5) will operate to position the elevator cage 31 adjacent the respective floors of the building structure.

For moving an automobile from the elevator cage 31 into a compartment, a cable 62 (Figs. 3, 6 and 7) is trained over a pair of sheaves 63 and 64, mounted respectively adjacent the respective end portions of the elevator cage platform 37, and having the opposite end portions of the cable 62 wound in opposite directions around a drum 65 rotatably mounted on the cage platform 37, and operatively related to a reversible motor 66, by which the drum 65 may be rotated in opposite directions.

Flexibly connected to the cable 62, preferably by means of a hinge 67 (Fig. 7), is a pusher, indicated as a whole by the numeral 68, and having engaging faces 69 adapted to engage either the front or rear bumper of an automobile to move it in one direction or another with respect to the elevator cage 31 to position the automobile in a receiving compartment on one of the floors 17, and for controlling the movement of the automobile down the inclined portion of the channels 22 formed in the compartments, a spring actuated drum 71 is rotatably mounted on a stud 72 rigidly secured in the pusher 68 and provided with a spring 73, having one of its end portions secured to the stud 72, and its opposite end portion connected to the drum 71. Wound around the drum 71, and having one of its end portions connected thereto, is a cable 74 provided at its opposite end with a hook-like member 75, adapted to be hooked over the bumper of an automobile in such a manner that when the weight of the automobile acts by gravity to run down the inclined portions of the channels 22, the cable 74 will tend to pay off from and rotate the drum 71 against the action of the spring 73, thereby easing the automobile into the lower end portions of the channels 22, where the vehicle will come to rest for storage until it is desired to remove the vehicle therefrom.

For moving a vehicle out of a compartment onto the platform 37 of the elevator cage 31, the hook-like member 75 may be placed over the bumper of an automobile and the cable 74 secured against movement with respect to the pusher 68 by means of an eccentric cam 76, adapted to impinge upon the cable 74, and bind the latter against a bar or stop 77 formed on the pusher 68, the cam 76 being adapted to be actuated by a handle 78, which may be employed also to rotate the cam 76 away from the cable 74 when the automobile has been positioned on the platform 37 of the elevator cage 31, the handle being adapted to rest on a stop 79 to permit free movement of the cable in controlling the movement of an automobile from the elevator cage into one of the compartments.

It will be understood that any suitable or well known control systems may be employed for controlling the operation of the motors 57 and 61 on the truck 23, and the hoisting motor 36 at the upper end portions of the guide frame 27, as well as the motor 66 on the elevator cage platform 37 for controlling the rotation of the drum 65, as these control systems are merely incidental to the present invention, and form no part thereof, except for controlling the operation and movements of the various elements constituting the present invention.

It will be observed from the foregoing description, that the present invention provides a novel construction and arrangement, whereby a large number of vehicles such, for example, as automobiles, or the like, may be housed or stored with a maximum of economy in floor space, and with a maximum of efficiency with respect to convenience and accessibility in handling or moving vehicles into and out of the storage space provided.

Also, that the present invention provides novel means for handling the automobile in "dead" or in inoperative condition and requires but a minimum of operating force to move the vehicles into and out of the storage space.

In the modified form of the invention illustrated in Figs. 10 to 13 inclusive, $37^1$ designates the floor of an elevator cage $31^1$, and $17^1$ indicates fragments of adjacent floors of the building. The pusher comprises among other things a rack bar 80, which travels in a channel 81, shown as located below the floor of an elevator car. The pusher has wheels or rollers 82 journaled on its sides which roll along rails $81^1$. Meshing with the teeth of the rack bar are two pairs of gear wheels 83, 84, disposed adjacent the ends of the elevator cage floor. The gear wheels are arranged in pairs, and between the gear wheels of each pair is a sprocket wheel 85 connected to the associated gear wheels by the square portion of a shaft 86, which is journaled in bearing brackets 87, carried by the channel 81. The gear wheels and sprocket wheels have square holes in which the square parts of the shafts are held.

Trained around the sprocket wheels 85 is a sprocket chain 88, which is driven by a sprocket wheel 89, mounted on a shaft 90, journaled in bearing brackets $90^1$, and driven by a reversing motor 91 carried by the elevator cage floor. Idler sprocket wheels $88^1$ journaled above the chain adjacent to the sprocket wheel 89, are provided for holding the sprocket chain in engagement with the sprocket wheel 89. Journaled in bearing brackets 92, secured to the ends of the rack bar 80, is a rod 93, which is disposed directly above the rack bar and extends from end to end thereof. Projecting from the rod 93, adjacent each end thereof, is an arm 94, which is arranged when in upright position to engage an adjacent bumper B of an automobile A. The arms can be moved into horizontal position so that an automobile can pass over the pusher without interference by any of its parts. Projecting from the arms 94 are lugs 95, which are arranged to engage the rack bar when the arms have been raised to their upright position, thereby preventing movement of the arms beyond such upright position.

Mechanical and manual means are provided for rotating the rod 93 through an arc of 90 degrees, so as to raise the arm from horizontal to vertical position. As shown, the mechanical means comprises a reversing motor 96 and its speed reducing gearing mounted on a platform 97, carried by the rack bar 80, a belt pulley 98 on the motor shaft, a belt pulley 99 on the rod 93, and a belt 100 trained around said belt pulleys.

The manual means for rotating the rod 93 comprises pawl and ratchet levers 101, pawl 102 carried thereby, and ratchet wheels 103 on the rod 93. The manual means for rotating the rod 93 are provided in the event of the failure of the motor 96. When the motor is used to rotate the rod 93, the pawls 102 are disengaged from the ratchet wheels 103.

To prevent the pusher from tilting downward when the major portion thereof has been projected from the channel member, cleats 104 may be bolted or otherwise secured to the floor of the elevator cage to overlie the pusher. When the pusher is located below the level of the elevator cage floor, the floor $17^1$ is provided with channels $17^2$ in alignment with the rack bar, so as to permit the rack bar to be projected from the channel member.

An automobile which has been driven upon the elevator cage floor may be pushed into an adjacent compartment on any floor at which the elevator cage is stopped by raising the arms 94, so that one will engage an adjacent bumper of the automobile. The motor 91 is then started to drive the sprocket chain in the direction in which the automobile is to be moved, and the pusher is thereby driven by the gear wheels which mesh with the rack bar. The rack bar presently runs off one pair of gear wheels, but the other pair remain in mesh with the rack bar and move it part way out of the channel member. The motor is stopped before the rack bar runs off the gear wheels which are driving it. By swinging down the arms, the automobile will gravitate towards the deepest part of the channels 22 in the floor of the compartment. The motor 91 is then driven in the opposite direction, and the pusher is moved back upon the floor of the elevator cage.

To move an automobile upon the elevator cage floor from a compartment, the elevator is raised or lowered to the floor of the compartment, the pusher is inserted under the automobile, the arms raised, bringing one arm 94 into engagement with the adjacent bumper of the automobile, and the motor 91 is started, thereby retracting the pusher and pulling the automobile upon the floor of the elevator cage.

Electric wiring and switches are provided for the two motors, but as these form no part of the invention, they are not shown or described herein.

Obviously, the present invention is not limited to the precise construction and arrangement shown and described, as the same may be variously modified. Moreover, all the features of the invention need not be used conjointly as the same may be used to advantage in variously different combinations and sub-combinations.

What I claim as new and desire to secure by Letters Patent is:

1. In a storage building of the character described, an elevator cage and an automobile pusher carried by said elevator cage, and comprising a channel member, a rack bar guided to longitudinally move therein, pinions at each end of the channel member meshing with said rack bar, motor driven means to move said pinions in either direction, a rod extending lengthwise of the rack bar and rotatably mounted thereon, arms secured to said rod at each end thereof and arranged to be rotated therewith to engage with a bumper of an automobile, and manual and motor operated means operatively connected to the rod for partially rotating said rod in either direction, said manual and mechanical means adapted to permit rotation of said arms either by said manual means or said motor means.

2. In a storage building of the character described, an elevator cage and an automobile pusher carried by said elevator cage, and comprising a channel member, a rack bar guided to longitudinally move therein, pinions at each end of the channel member meshing with said rack bar, motor driven means to move said pinions in either direction, a shaft extending lengthwise of the rack bar and rotatably mounted thereon, arms secured to said shaft at each end thereof and arranged to be rotated therewith, said arms being adapted to lie upon the floor of said cage upon being rotated to the depressed position, and being adapted to engage with a bumper of an automobile upon being rotated to an upright position, mechanical and manual means to partially rotate said shaft whereby to raise said arms into upright position for engagement with a bumper of an automobile, said mechanical and manual means including the aforesaid shaft operatively connected to the arms, and said mechanical and manual means adapted to permit rotation of said arms either by said mechanical means or by said manual means.

JOHN N. MURPHY.

References Cited in the file of this patent

UNITED STATES PATENTS

| Number | Name | Date |
|---|---|---|
| 400,503 | Stanley | Apr. 2, 1889 |
| 516,893 | Leyson | Mar. 20, 1894 |
| 825,743 | Merry | July 10, 1906 |
| 930,354 | Covell | Aug. 10, 1909 |
| 1,486,275 | Becker | Mar. 11, 1924 |
| 1,614,905 | Tunison | Jan. 18, 1927 |
| 1,800,079 | Johnston | Apr. 7, 1931 |
| 1,896,063 | Bottini | Feb. 7, 1933 |
| 2,047,347 | Wheelock | July 14, 1936 |
| 2,280,567 | Austin | Apr. 21, 1942 |
| 2,285,232 | Sheehan | June 2, 1942 |
| 2,311,131 | Rudolph | Feb. 16, 1943 |
| 2,428,856 | Sinclair | Oct. 14, 1947 |
| 2,483,817 | Ehinger | Oct. 4, 1949 |